US011888528B2

(12) United States Patent
Kazama et al.

(10) Patent No.: US 11,888,528 B2
(45) Date of Patent: Jan. 30, 2024

(54) OPTICAL COMMUNICATION SYSTEM

(71) Applicant: Nippon Telegraph and Telephone Corporation, Tokyo (JP)

(72) Inventors: Takushi Kazama, Musashino (JP); Takeshi Umeki, Musashino (JP); Takahiro Kashiwazaki, Musashino (JP); Osamu Tadanaga, Musashino (JP); Koji Embutsu, Musashino (JP); Nobutatsu Koshobu, Musashino (JP); Asuka Inoue, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 38 days.

(21) Appl. No.: 17/785,807

(22) PCT Filed: Dec. 19, 2019

(86) PCT No.: PCT/JP2019/049782
§ 371 (c)(1),
(2) Date: Jun. 15, 2022

(87) PCT Pub. No.: WO2021/124505
PCT Pub. Date: Jun. 24, 2021

(65) Prior Publication Data
US 2023/0053856 A1 Feb. 23, 2023

(51) Int. Cl.
*H04B 10/00* (2013.01)
*H04B 10/548* (2013.01)
(Continued)

(52) U.S. Cl.
CPC .......... *H04B 10/548* (2013.01); *H04B 10/25* (2013.01); *H04B 10/61* (2013.01)

(58) Field of Classification Search
CPC .. H04B 10/29; H04B 10/291; H04B 10/2912; H04B 10/294; H04B 10/61; H04B 10/615
See application file for complete search history.

(56) References Cited

U.S. PATENT DOCUMENTS

2017/0085322 A1* 3/2017 Kim ..................... G02F 1/377
2017/0141871 A1* 5/2017 Yang .................. H04B 10/564

OTHER PUBLICATIONS

Takeshi Umeki et al., *Phase Sensitive Degenerate Parametric Amplification Using Directly-Bonded PPLN Ridge Waveguides*, Optics Express, vol. 19, No. 7, 2011, pp. 6326-6332.
(Continued)

*Primary Examiner* — Daniel G Dobson
(74) *Attorney, Agent, or Firm* — Workman Nydegger

(57) ABSTRACT

According to the present disclosure, it is possible to realize an optical communication system in which a relay-type PSA and homodyne detection are efficiently combined using a single phase synchronization mechanism. Intensity noise and phase noise can be suppressed to a very low level, and accurate transmission of signals with increased multiplicity is enabled. By utilizing the features of the PSA to extract the phase of a single carrier using the sum frequency light of the signal light and its phase-conjugated light, the number of pilot carriers can be reduced compared to the configuration of the conventional optical communication system, and it is possible to suppress unnecessary nonlinear noise.

17 Claims, 9 Drawing Sheets

(51) Int. Cl.
 *H04B 10/25* (2013.01)
 *H04B 10/61* (2013.01)
 *H04J 14/00* (2006.01)

(56) References Cited

OTHER PUBLICATIONS

Takeshi Umeki et al., *In-Line Phase Sensitive Amplifier Based on PPLN Waveguides*, Optics Express, vol. 21, No. 10, 2013, pp. 12077-12084.

Masaki Asobe et al., *In-Line Phase-Sensitive Amplifier for QPSK Signal Using Multiple QPM LiNbO₃ Waveguide*, 2013 18th OptoElectronics and Communications Conference held jointly with 2013 International Conference on Photonics in Switching (OECC/PS), Jun. 30, 2013, pp. 1-2.

Masashi Abe et al., *PDM-QPSK WDM Signal Amplification Using PPLN-Based Polarization-Independent In-Line Phase-Sensitive Amplifier*, 42nd European Conference on Optical Communication (ECOC'16), Sep. 18, 2016, pp. 743-745.

Yasuhiro Okamura et al., *Optical Pump Phase Locking to A Carrier Wave Extracted from Phase-Conjugated Twin Waves for Phase-Sensitive Optical Amplifier Repeaters*, Optics Express, vol. 24, No. 23, 2015, pp. 26300-26306.

Yixin Wang et al., *Polarization-Multiplexed, 10 Gsymbol/S, 64 QAM Coherent Transmission Over 150 Km with OPLL-Based Homodyne Detection Employing Narrow Linewidth LDs*, IEICE Electronics Express, vol. 8, No. 17, 2011, pp. 1444-1449.

Abel Lorences-Riesgo et al., *Self-Homodyne 24×32-QAM Superchannel Receiver Enabled by All-Optical Comb Regeneration Using Brillouin Amplification*, Optics Express, vol. 24, No. 26, 2016, pp. 29714-29723.

\* cited by examiner

OPTICAL COMMUNICATION SYSTEM

TECHNICAL FIELD

The present invention relates to an optical communication system and an optical receiver.

BACKGROUND ART

In a long-distance transmission system such as a long-distance backbone optical fiber communication network, it is required that client signals such as Ethernet (registered trademark), which are becoming faster, are efficiently incorporated into transmission signals. It is important to improve the channel speed along with an increase in the capacity of the long-distance transmission system.

For this purpose, it is necessary to increase the multiplicity of the modulation scheme. If the multiplicity of the modulation scheme is increased, the interval between signal points is narrowed in the signal space diagram. In order to stably identify adjacent signal points, noise in the transmission path must be suppressed to a small level. In order to increase the system capacity by increasing the multiplicity, a drastic increase in the S/N of the transmission path is required.

Accumulation of light noise spontaneously emitted from optical amplifiers is a major factor causing S/N deterioration in long-distance transmission systems. Suppressing spontaneously-emitted light noise is important for improving the SNR of the transmission path. In laser amplifiers such as erbium-doped fiber laser amplifiers (EDFAs), there is a theoretical limit on the minimum value of spontaneously-emitted light noise, and the S/N of the signal light drops by at least 3 dB due to amplification. This increases the transmission code error rate during signal transmission and lowers the transmission quality.

In order to solve this problem, a Phase Sensitive Amplifier (PSA) is being studied. A PSA has a function of shaping a signal light waveform and a phase signal. Also, since spontaneously-emitted light having a quadrature phase unrelated to the signal can be suppressed and spontaneously-emitted light of the same phase can also be minimized, it is possible in principle to keep the S/N of the signal light the same before and after amplification without deterioration.

FIG. 1 shows a basic configuration of a conventional PSA. As shown in FIG. 1, a PSA 100 includes a phase-sensitive optical amplification unit 101 using optical parametric amplification, an excitation light source 102, an excitation light phase control unit 103, and first and second light branching units 104-1 and 104-2. As shown in FIG. 1, a signal light 110 input to the PSA 100 is branched into two by the light branching unit 104-1, one of which is incident on the phase-sensitive optical amplification unit 101 and the other of which is incident on the excitation light source 102. Excitation light 111 emitted from the excitation light source 102 has its phase adjusted via the excitation light phase control unit 103, and is incident on the phase-sensitive optical amplification unit 101. The phase-sensitive amplification unit 101 outputs an output signal light 112 based on the input signal light 110 and the excitation light 111.

The phase-sensitive optical amplification unit 101 has a characteristic of amplifying the signal light 110 when the phase of the incident signal light 110 and the phase of the excitation light 111 match each other, and attenuating the signal light 110 upon entering a quadrature phase relationship in which the phases of the two are shifted by 90 degrees. When the phases of the excitation light 111 and the signal light 110 are matched such that the amplification gain is maximized using this characteristic, spontaneously-emitted light having a phase in quadrature to that of the signal light 110 is not generated. Also, even for components having the same phase, the signal light 110 can be amplified without causing the S/N ratio to deteriorate because an excessive amount of spontaneously-emitted light is not emitted more than the noise of the signal light.

In order to achieve such phase synchronization of the signal light 110 and the excitation light 111, the excitation light phase control unit 103 controls the phase of the excitation light 111 so as to synchronize with the phase of the signal light 110 branched by the first optical branching unit 104-1. In addition, the excitation light phase control unit 103 detects part of the output signal light 112 branched by the second optical branching unit 104-2 with a narrow band detector, and controls the phase of the excitation light 111 such that the amplification gain of the output signal light 112 is maximized. As a result, in the phase-sensitive optical amplification unit 102, optical amplification without deterioration of the S/N ratio is realized using the above-described principle.

Note that the excitation light phase control unit 103 may also have a configuration in which the phase of the excitation light source 102 is controlled directly, other than the configuration in which the phase of the excitation light 111 is controlled on the output side of the excitation light source 102. Also, if the light source that generates the signal light 110 is arranged near the phase-sensitive optical amplification unit 101, part of the light source for the signal light can be branched and used as the excitation light.

Examples of a non-linear optical medium for performing the above-described parametric amplification include a method of using a second-order nonlinear optical material represented by a periodically poled $LiNbO_3$ (PPLN) waveguide and a method of using a third-order nonlinear optical material represented by a quartz glass fiber.

FIG. 2 illustrates a configuration of a conventional PSA using a PPLN waveguide disclosed in NPL 1 and the like. A PSA 200 shown in FIG. 2 includes an erbium-doped fiber laser amplifier (EDFA) 201, first and second second-order nonlinear optical elements 202 and 204, first and second light branching portions 203-1 and 203-2, a phase modulator 205, an optical fiber extender 206 made of PZT, a polarization-holding fiber 207, an optical detector 208, and a phase-locked loop (PLL) circuit 209. The first second-order nonlinear optical element 202 includes a first spatial optical system 211, a first PPLN waveguide 212, a second spatial optical system 213, and a first dichroic mirror 214, and the second second-order nonlinear optical element 204 includes a third spatial optical system 215, a second PPLN waveguide 216, a fourth spatial optical system 217, a second dichroic mirror 218, and a third dichroic mirror 219.

The first spatial optical system 211 couples the light input from an input port of the first second-order nonlinear element 202 to the first PPLN waveguide 212. The second spatial optical system 213 couples the light output from the first PPLN waveguide 212 to the output port of the first second-order nonlinear optical element 202 via the first dichroic mirror 214. The third spatial optical system 215 couples the light input from the input port of the second second-order nonlinear optical element 204 to the second PPLN waveguide 216 via the second dichroic mirror 218. The fourth spatial optical system 217 couples the light output from the second PPLN waveguide 216 to the output port of the second second-order nonlinear optical element 204 via the third dichroic mirror 219.

In the example shown in FIG. 2, the signal light 250 incident on the PSA 200 is branched by the optical branching portion 203-1, and one of the branched portions is incident on the second second-order nonlinear optical element 204. The other is phase-controlled via the phase modulator 205 and the optical fiber extender 206 as excitation fundamental-wave light 251 and is incident on the EDFA 201. In order to obtain power sufficient for obtaining a nonlinear optical effect from a weak laser light used for optical communication, the EDFA 201 amplifies the incident excitation fundamental-wave light 251 and makes it incident on the first second-order nonlinear optical element 202. In the first second-order nonlinear optical element 202, a second harmonic (SH light: Second Harmonics) 252 is generated from the incident excitation fundamental-wave light 251 and the generated SH light 252 is incident on the second second-order nonlinear optical element 204 via the polarization-holding fiber 207. In the second second-order nonlinear optical element 204, phase-sensitive amplification is performed by performing degenerate parametric amplification with the incident signal light 250 and the SH light 252, and an output signal light 253 is output.

In the PSA, in order to amplify only the light that is in phase with the signal, it is necessary that the phase of the signal light and the phase of the excitation light match each other as described above or are shifted by $\pi$ radians. That is, if the second-order nonlinear optical effect is to be used, it is necessary that the phase $\varphi 2\omega s$ of the excitation light, which has a wavelength corresponding to that of the SH light, and the phase $\varphi \omega s$ of the signal light satisfy the following relationship (Equation 1). Here, n is an integer.

$$\Delta \varphi = \tfrac{1}{2}(\varphi 2\omega s - \varphi \omega s) = n\pi \quad \text{(Equation 1)}$$

FIG. 3 is a graph showing the relationship between the phase difference $\Delta \varphi$ between the input signal light and the excitation light and the gain (dB) in the PSA using the second-order nonlinear optical effect. It can be understood that the gain is at its maximum when $\Delta \varphi$ is $-\pi$, 0, or $\pi$.

In the configuration shown in FIG. 2, in order to synchronize the phases of the signal light 250 and the excitation fundamental-wave light 251, the phase modulator 205 is used to perform phase modulation on the excitation fundamental-wave light 251 using a weak pilot signal, and thereafter a portion of the output signal light 253 is branched and is detected by the detector 208. This pilot signal component reaches its minimum when phase synchronization with the minimum phase difference $\Delta \varphi$ shown in FIG. 3 is obtained. Accordingly, the PLL circuit 209 is used to perform feedback to the optical fiber extender 206 such that the pilot signal reaches its minimum, that is, the amplified output signal reaches its maximum. Through such a feedback operation, the phase of the excitation fundamental-wave light 251 can be controlled to achieve phase synchronization between the signal light 250 and the excitation fundamental-wave light 251.

In the above-described configuration in which the PPLN waveguide is used as a nonlinear medium, the signal light 250 and the SH light 252 are incident on the second second-order nonlinear optical element 204, and degenerate parametric amplification is performed, for example, the component of the excitation fundamental-wave light is removed using the characteristics of the dichroic mirror 214. As a result, only the SH light 252 and the signal light 250 can be incident on a parametric amplification medium such as the second second-order nonlinear optical element 204. Since noise caused by mixing of spontaneously-emitted light generated by the EDFA 201 can be prevented, low-noise optical amplification becomes possible.

Since the PSA not only has less intensity noise, but also has the effect of reducing phase noise, when used as a relay amplifier or preamplifier for a receiver in optical communication, it is possible to reduce non-linear distortion of the transmission path or the like, and it is effective in improving the quality of optical signals. NPL 2 discloses an exemplary configuration of relay amplification of a PSA using a degenerate parametric process.

On the other hand, phase-sensitive amplification using the degenerate parametric process described above has a property of attenuating quadrature phase components as shown in FIG. 3. For this reason, it can be used only for amplification of a normal intensity modulated signal or a modulated signal such as IMDD, BPSK, or DPSK that uses binary phase modulation. Also, in phase-sensitive amplification using a degenerate parametric process, the phase-sensitive amplification can be performed only on signal light of one wavelength. In order to apply a PSA to optical communication technology, it is necessary to use a configuration that can support various optical signals, such as a multi-valued modulation format and a wavelength multiplexed signal. NPL 3 discloses a configuration based on non-degenerate parametric amplification in which phase-conjugated light that is a pair of signal lights is prepared in advance and used as input light to a nonlinear medium such as PPLN.

Here, attention will be given to a more specific phase synchronization method used in the case of applying a PSA to optical communication. If a PSA is placed immediately downstream of a transmitter of an optical signal and a light source that generates a signal light is near a phase-sensitive optical amplification unit as in the basic configuration shown in FIG. 2, a portion of the output of the light source for the signal light can be branched and used as the excitation light. However, if the PSA is used as a relay amplifier in light transmission, it is necessary to extract the average phase from the light-modulated signal light and generate an excitation light synchronized with the carrier-wave phase of the signal. If the PSA is to be used as a relay amplifier in optical transmission, it is important to configure the PSA as well as the method for extracting the carrier-wave phase.

A configuration (NPL 4) in which a continuous wave (CW) pilot carrier having the same phase as a carrier phase of a modulated signal is known as a configuration for applying a PSA to a relay amplifier. By sending the pilot carrier to an optical fiber transmission path together with a signal light and performing optical injection locking with a local oscillation light installed at the relay amplification point, it is possible to generate a local oscillation excitation light that is phase-synchronized with the signal light. However, in this configuration, there is a problem in that the pilot carrier that is transmitted together with the signal light occupies a portion of the signal band and the band usage efficiency is lowered. There has also been a problem in that by transmitting CW light as well, unnecessary converted light resulting from four-wave mixing in the fiber is generated, thus causing signal quality to deteriorate.

A configuration using an optical phase lock loop (OPLL) has been proposed as another configuration for applying a relay amplifier (NPL 5). In this OPLL configuration, no pilot carrier is needed, and extraction of the carrier-wave phase from the modulated signal light is performed, and therefore the PSA can be applied to the relay amplifier without reducing the band usage efficiency.

FIG. 4 is a configuration diagram of a relay-type PSA using the conventional OPLL. A relay-type PSA 300 includes, as main constituent components, a local oscillation phase synchronization circuit 301 that generates an excitation light 327, and a PSA 302. A portion of a signal light 304 is tapped by a coupler 306 and is input to a first second-order nonlinear optical element 309 of the local oscillation phase synchronization circuit 301 via a BPF 307 and an EDFA 308. A local oscillation light 325 from a local oscillation light source 303 is input to an LN phase modulator 314, which will be described later, via an EDFA 315. The local oscillation phase synchronization circuit 301 operates so as to generate an excitation light 326 that is phase-synchronized with the signal light 304 as described below, from the tapped signal light.

FIG. 5 is a diagram schematically illustrating an optical frequency spectrum of a signal light and the like in each part of the OPLL of FIG. 4. Hereinafter, the operation of the relay-type PSA 300 will be described with reference to FIGS. 4 and 5 alternatingly. The signal light 304 in FIG. 4 is composed of a pair 400 of a phase-modulated signal light $\varphi s$ and a phase-conjugated light (idler light) $\varphi i$ as shown in FIG. 5. At the signal light transmission source, a pair 400 of a signal light $\varphi s$ and a phase-conjugated light $\varphi i$ is generated using a pump light $\varphi_{pump}$ and is transmitted as the signal light 304 to an optical transmission path. In the following description, $\varphi$ indicates the optical frequency of each signal or the like.

Returning to FIG. 4, the propagated signal light 304 is tapped by the optical coupler 306, and is restored in intensity by the EDFA 308 via the BPF 307, and thereafter is input to the first second-order nonlinear optical element 309. In the first second-order nonlinear optical element 309, a sum frequency generation mechanism (SFG: Sum Frequency Generation) in the second-order nonlinear medium (PPLN in this case) generates a sum frequency light 320 (Sum Frequency: $\varphi_{SF}$) based on the above-mentioned pair 400 of the signal light and the phase-conjugated light. The generation of the sum frequency light based on the pair of the signal light and the phase-conjugated light through the SFG process is shown as $\varphi_{SF}$ 401 in FIG. 5. As shown in FIG. 5, the optical frequency $\varphi_{SF}$ of the sum frequency light is twice the optical frequency $\varphi_{pump}$ of the pump light, that is, $2\varphi_{pump}$. At this time, the phase modulation component is canceled by the SFG process of the signal light $\varphi s$ and the phase-conjugated light $\varphi i$, and the sum frequency light $\varphi_{SF}$ 401 by which the carrier-wave phase is reproduced is generated. That is, with the sum frequency light $\varphi_{SF}$ 401 obtained from the data-modulated signal light 304 by the first second-order nonlinear optical element 309, the phase information of the carrier wave used to generate the signal light at the transmission source is reproduced.

The local oscillation light 325 generated from the local oscillator (Lo) 303 is used in OPLL, which will be further described below, to generate an excitation light synchronized with the sum frequency light $\varphi_{SF}$ 401 from which the carrier-wave phase has been extracted. The local oscillation light 325 is amplified by the EDFA 315 and thereafter is subjected to, for example, phase modulation by the LN modulator 314. As shown in the spectrum of FIG. 5, a plurality of sideband lights (side waves) 403 resulting from modulation above and below the optical frequency $\varphi_{LO}$, that is, components such as optical frequencies $\varphi_{L-1}$, $\varphi_{L+1}$, $\varphi_{L-2}$, and $\varphi_{L+2}$, are generated in the local oscillation light $\varphi_{LO}$.

Of these sideband lights, a first-order sideband light $\varphi_{L+1}$ on the high-frequency side is converted into second harmonic (SH) light through a second harmonic generation process (SHG: Second Harmonic Generation) in the second-order nonlinear medium (PPLN) of the second second-order nonlinear optical element 310. Once again referring to the spectrum of FIG. 5, the SH light $\varphi_{SH}$ ($=2\varphi_{L+1}$) 402 is generated from the first-order sideband light $\varphi_{L+1}$ through the SHG process of the second second-order nonlinear optical element 310. The optical frequency of the local oscillation light 325 and the modulation frequency of the LN modulator 314 are selected such that the sum frequency light $\varphi_{SF}$ 401 having information on the above-mentioned carrier-wave phase and the SH light $\varphi_{SH}$ 402 have the same optical frequency.

A balanced detector 311 compares the frequencies and phases of the sum frequency light $\varphi_{SF}$ 401 and the SH light $\varphi_{SH}$ 402 described above. An AC detection output 322 according to the frequency and phase differences is obtained from the balanced detector 311, and a low-speed error signal 323 is further obtained by the loop filter 312. The error signal 323 is input as a control signal of a VCO 313. The oscillation output 324 from the VCO 313 is supplied to the above-mentioned LN modulator 314 as a modulation signal for generating sideband light. In this manner, the OPLL feedback loop is formed by the path of the LN modulator 314, the balanced detector 311, the loop filter 312, and the VCO 313. The output frequency of the VCO 313 is adjusted so as to eliminate the frequency difference and phase difference between the sum frequency light $\varphi_{SF}$ 401 and the SH light $\varphi_{SH}$ 402, and the optical frequency and phase of the first-order sideband light $\varphi_{L+1}$ change. As a result, a first-order sideband light $\varphi_{L+1}$ that is synchronized with the optical frequency and phase of the sum frequency light $\varphi_{SF}$ 401 is obtained.

The modulated local oscillation light including the phase-synchronized first-order sideband light $\varphi_{L+1}$ is branched on the output side of the LN modulator 314, and only the first-order sideband light $\varphi_{L+1}$ is cut out from the branched light 326 by the BPF 316 as shown in FIG. 5. The phase-synchronized sideband light $\varphi_{L+1}$ is restored in intensity by the EDFA 317 and is supplied to the PSA 302 as the phase-synchronized excitation light 327.

The operations of the local oscillation phase synchronization circuit 301 described above can be summarized as follows. First, the average phase of the signal light 304 is extracted in the sum frequency light $\varphi_{SF}$ 401 through the SFG process of the first second-order nonlinear optical element 309. Second, an error signal 323 obtained based on the phase difference between the sum frequency light $\varphi_{SF}$ 401 and the SH light $\varphi_{SH}$ generated from the first-order sideband light $\varphi_{L+1}$ of the local oscillation light 325 is generated. Third, the VCO 313 is controlled by the error signal 323 to control the optical frequency of the first-order sideband light $\varphi_{L+1}$ and to be phase-synchronized with the sum frequency light $\varphi_{SF}$ 401. Fourth, only the phase-synchronized first-order sideband light $\varphi_{L+1}$ is cut out by the BPF 316, the intensity is restored, and the excitation light of the PSA is generated.

By forming a relay-type PSA using the excitation light obtained through the OPLL as described above, the intensity noise and phase noise of the transmission path can be reduced, and the transmission capacity of the long-distance transmission system can be increased by increasing the multiplicity of the modulated signal.

CITATION LIST

Non-Patent Literature

[NPL 1] T. Umeki, O. Tadanaga, A. Takada and M. Asobe, "Phase sensitive degenerate parametric amplification using directly-bonded PPLN ridge waveguides," Optics Express, 2011, Vol. 19, No. 7, p. 6326-6332
- [NPL 2] Takeshi Umeki, Masaki Asobe, and Hirokazu Takenouchi, "In-line phase sensitive amplifier based on PPLN waveguides," Optics Express, May 2013, Vol. 21, No. 10, p. 12077-12084
- [NPL 3] M. Asobe, T. Umeki, H. Takenouchi, and Y. Miyamoto, "In-line phase-sensitive amplifier for QPSK signal using multiple QPM $LiNbO_3$ waveguide," In Proceedings of the OptoElectronics and Communications Conference, OECC, 2013, PDP paper PD2-3
- [NPL 4] M. Abe, T. Kazama, T. Umeki, K. Enbutsu, Y. Miyamoto, and H. Takenouchi, "PDM-QPSK WDM Signal amplification using PPLN-based polarization-independent in-line phase-sensitive amplifier," in Proc. 42nd European Conference on Optical Communication (ECOC '16), 2016, paper W.4.P1.SC2.4
- [NPL 5] Y. Okamura et al., "Optical pump phase locking to a carrier wave extracted from phase-conjugated twin waves for phase-sensitive optical amplifier repeaters," 2016, Opt. Exp., vol. 24, no. 23, pp. 26300-26306
- [NPL 6] Y. Wang, K. Kasai, and M. Nakazawa, "Polarization-multiplexed, 10 Gsymbol/s, 64 QAM coherent transmission over 150 km with OPLL-based homodyne detection employing narrow linewidth LDs.", 2011, IEICE Electron. Express, 8(17), pp. 1444-1449
- [NPL 7] Abel Lorences-Riesgo, Mikael Mazur, Tobias A. Eriksson, Peter A. Andrekson, and Magnus Karlsson, "Self-homodyne 24×32-QAM superchannel receiver enabled by all-optical comb regeneration using Brillouin amplification," 2016, Opt. Express 24, pp. 29714-29723

SUMMARY OF THE INVENTION

Technical Problem

In order to realize an increase in the multiplicity of a signal, in addition to improvement of the S/N ratio on the transmission side and the transmission path of the system, the following problems to be solved are also present. In order to identify the signal points of a modulated signal having a high degree of multiplicity, high accuracy is also required for reproducing the phase of the optical signal on the receiving side of the system. By using a PSA in an optical transmission system, it is possible to reduce the phase noise generated by the signal light propagating in the transmission path. On the other hand, there are other dominant factors that limit the accuracy of the signal phase. It is necessary to consider fluctuations in the phase and frequency of the laser light source itself on the transmitting side and the phase detection error accompanying coherent detection on the receiving side. In digital coherent transmission, phase estimation can also be performed by making full use of a digital signal processor (DSP) on the receiving side, but the estimation accuracy thereof is limited. For this reason, phase noise remains in the demodulated signal, and in a conventional optical transmission system, transmission at a multiplicity of up to about 64 values is the limit for optical signals.

A technique for performing highly accurate coherent reception (homodyne detection) using an optical phase synchronization technique has also been proposed as a means for supporting an increase in the multiplicity of a signal on the receiving side of an optical transmission system. NPL 6 shows an example of single-carrier optical transmission, and NPL 7 shows an example of optical transmission of a WDM signal using a wavelength division multiplexing (WDM) scheme. In homodyne detection, the received signal light is converted into a baseband signal by generating a beat between the signal light and the local oscillator (Lo) light of the receiver. At this time, if the phase of the signal light and the phase of the Lo light are not synchronized, a phase error occurs after demodulation, and accurate demodulation cannot be performed.

In NPL 6 and NPL 7, a CW pilot carrier having carrier phase information of the signal light on the transmitting side is transmitted from the transmitter together with the signal light, and this pilot carrier is synchronized with the phase of the Lo light of the receiver. The carrier phase of the signal light on the transmitter side and the phase of the Lo light on the receiver side are synchronized via the pilot carrier, and a single-wave pilot carrier is used in the case of a single carrier (NPL 6), and a two-wave pilot carrier (NPL 7) is used in the case of WDM. Through such a phase synchronization scheme, accurate demodulation is possible even for a signal light having increased multiplicity.

However, due to the simultaneous transmission of the pilot carrier, signal light quality deterioration caused by non-linear processes occurs to some extent in the transmission fiber. Also, since the communication band is used for the pilot carrier, wavelength band resources are wasted. The inventors propose a more efficient system that satisfies the need for an increase in the multiplicity of digital modulation and uses PAS and homodyne detection.

Means for Solving the Problem

One embodiment of the present disclosure is an optical communication system including: a transmitter configured to output a signal light having two subcarriers that are generated from a single carrier light and are modulated using data in a phase-conjugate relationship; and a receiver including a light phase synchronization mechanism configured to generate a synchronized light that is phase-synchronized with the signal light transmitted from the transmitter, the light phase synchronization mechanism including a second-order nonlinear optical element configured to generate a sum frequency light of the two subcarriers of the transmitted signal light, a second-order nonlinear optical element configured to generate a second harmonic light of sideband light generated from a local oscillation light, and a feedback loop mechanism configured to compare frequencies and phases of the sum frequency light and the second harmonic light and synchronize the phases of the transmitted signal light and the sideband light, the light phase synchronization mechanism being configured to output the sideband light as the synchronization light, a non-degenerate optical phase-sensitive amplifier configured to use the synchronized light to amplify the transmitted signal light, and a coherent receiver configured to use the synchronized light to demodulate the amplified signal light.

Another embodiment of the present disclosure is a transmitter configured to output a wavelength division multiplexing (WDM) signal including one pilot carrier and a signal group including a pair of a signal light and a phase-conjugated light on two or more wavelength channels, the signal light of the two or more wavelength channels being generated by modulating each optical carrier of a portion of an optical comb generated from a single light source light; and a receiver including a light phase synchronization mechanism configured to generate a synchronized light that is phase-synchronized with the WDM signal transmitted from the transmitter, the light phase synchronization mechanism including a second-order nonlinear optical element configured to generate a sum frequency light of the signal light and the phase-conjugated light of the transmitted WDM signal, a local oscillation light source configured to perform injection locking using the pilot carrier extracted from the transmitted WDM signal, a second-order nonlinear optical element configured to generate one second harmonic light in an optical comb generated from an injection-locked local oscillation light from the local oscillation light source, and a feedback loop mechanism configured to compare frequencies and phases of the sum frequency light and the second harmonic light and synchronize the phases of the transmitted WDM signal and the optical comb, the light phase synchronization mechanism being configured to output the optical comb as the synchronized light, a non-degenerate optical phase-sensitive amplifier configured to use the synchronized light to amplify the transmitted WDM signal, and a coherent receiver configured to use the synchronized light to demodulate the amplified WDM signal.

Effects of the Invention

It is possible to provide an optical communication system that accurately and efficiently transmits a signal with increased multiplicity.

DESCRIPTION OF EMBODIMENTS

According to the present disclosure, it is possible to realize an optical communication system in which a relay-type PSA and homodyne detection are efficiently combined using a single phase synchronization mechanism. Intensity noise and phase noise can be suppressed to an extremely low level, and accurate transmission of signals with increased multiplicity is enabled. By utilizing the features of the PSA and extracting the phase of a single carrier using the sum frequency light of the signal light and its phase-conjugated light, the number of pilot carriers can be reduced compared to the configuration of the conventional optical communication system, and it is possible to suppress unnecessary nonlinear noise.

In the following description, the configuration of an optical communication system including a transmitter that emits a characteristic signal light and a receiver including a PSA and a coherent receiver is disclosed. The receiver includes an optical phase synchronization mechanism, and generates a local oscillation light or a local oscillation optical comb synchronized with the transmitted signal light, and supplies it to the PSA and the coherent receiver, respectively. Different embodiments are disclosed for the case where the transmission signal from the transmitter is single-carrier and the case of using a WDM signal in which two or more signal lights are multiplexed on a wavelength channel.

First Embodiment

Figure 6:
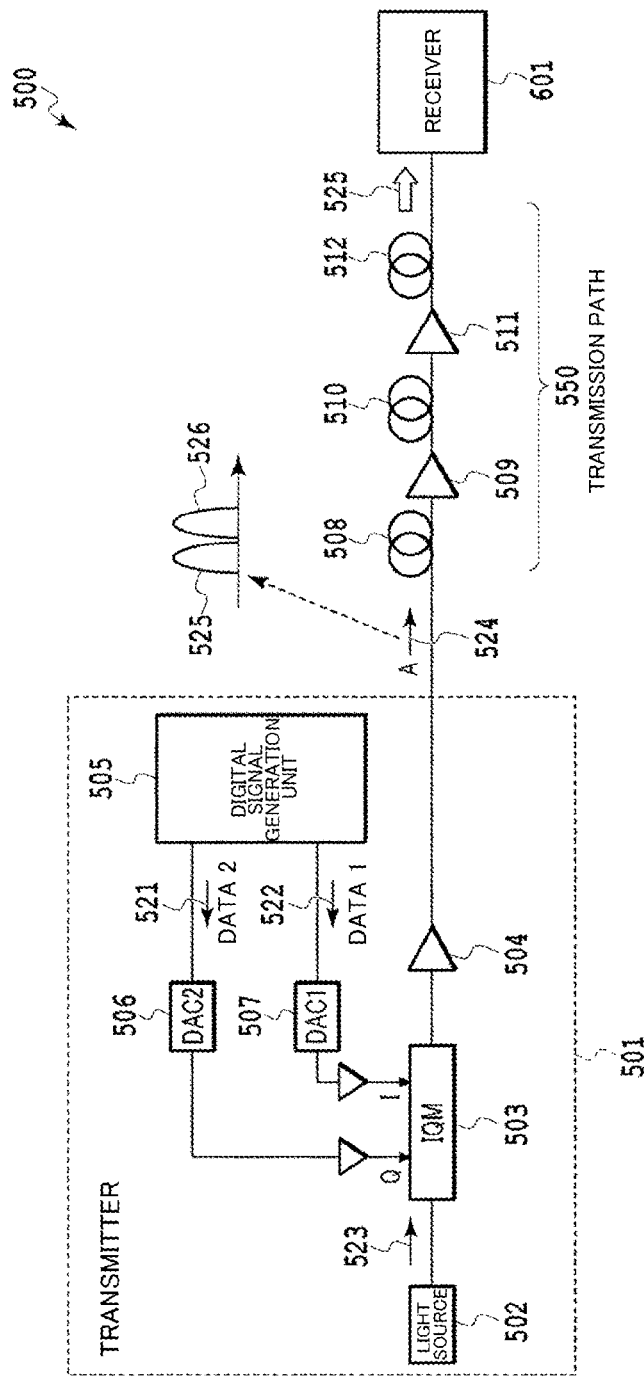
FIG. 6 is a diagram showing a configuration of an optical communication system according to a first embodiment of the present disclosure.
Figure 7:
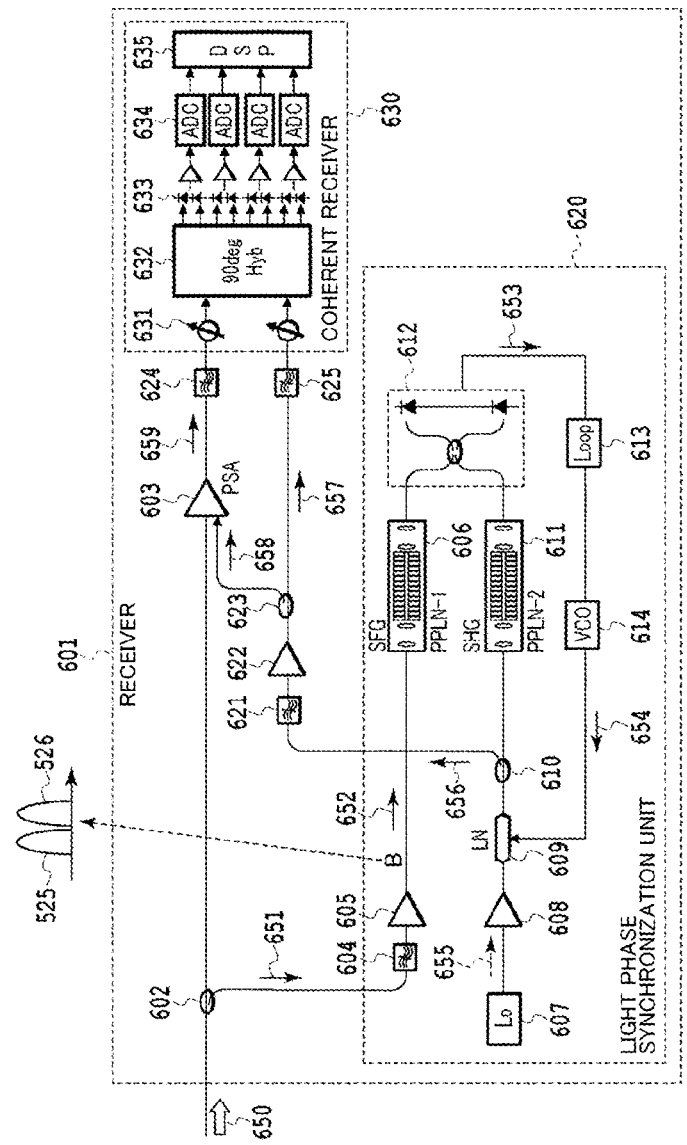
FIG. 7 is a diagram showing a configuration of a receiver of the optical communication system of the first embodiment.

FIG. 6 is a diagram showing a configuration of an optical communication system according to the first embodiment of the present disclosure. An optical communication system 500 of the present embodiment transmits information from the transmitter 501 to a receiver 601 via the transmission path 550 using a single-carrier signal, that is, a signal light 524 generated from a single carrier. In the optical communication system 500 of FIG. 6, a detailed configuration of the transmitter 501 and the elements of the transmission path 550 are shown, but the details of the receiver 601 are illustrated in FIG. 7 below.

The signal light 524 is transmitted from the transmitter 501 and propagates through the transmission path 550 relayed by the relay-type PSAs 509 and 511 between the dispersion compensation-type optical fibers 508, 5010, and 512. The signal light 525 that has propagated through the transmission path 550 reaches the receiver 601. Specific configurations such as the number and types of relay amplifiers on the transmission path 550 are not limited to those shown in FIG. 6. The configuration and operation of the receiver 601 will be described later together with FIG. 7, and a configuration in which a PSA using a PPLN waveguide and homodyne detection are combined for a single carrier signal is shown. In the optical communication system of the present embodiment, the phase-synchronized local oscillation light generated using an OPLL on the receiver side is used as the excitation light of the PSA and the Lo light for homodyne detection, whereby it is possible to reduce the intensity noise and the phase noise of a signal with increased multiplicity.

Referring again to FIG. 5, the transmitter 501 of the optical communication system 500 supplies the carrier light 523 output from the light source 502 to an IQ modulator 503. Baseband signals I and Q are input to the IQ modulator 503 to perform data modulation. The digital signal generation unit 505 outputs digital first digital signal data 522 and second digital signal data 521, which are converted into analog signals through a first DAC 504 and a second DAC 506, respectively. The two analog outputs are amplified through the drive amplifier depending on the type of the IQ modulator 503 and are thereafter input to the IQ modulator 503 as baseband signals I and Q, respectively. As the IQ modulator 503, for example, an optical modulator using the electro-optical effect of LN can be used.

The optical communication system of the present embodiment is characterized in that, as the signal light to be transmitted from the transmitter 501, baseband signals I and Q are supplied to an IQ modulator 503, the baseband signals I and Q being such that two subcarriers composed of the signal light and its phase-conjugated light are generated with respect to a carrier light 523 from a light source 502, using the carrier light 523 as the center on the wavelength axis. In other words, as shown in FIG. 6, the signal light 524 output from the transmitter 501 is composed of the signal light 525 and its phase-conjugated light 526 (two subcarriers) on the wavelength axis. Also, the approximately intermediate position between the two lights 525 and 526 corresponds to the wavelength of the carrier light 523 from the light source 502.

The phase-conjugated light is a signal light that is generated using a nonlinear optical substance or the like, and is obtained by inverting the spatial information of the phase with respect to the signal light. By transmitting the signal light and the phase-conjugated light as a pair, the PSA can be used during and after transmission on the transmission path. As also described in FIG. 5, in general, phase-conjugated light in a transmitter is generated from a signal light using pump light generated by a second-order nonlinear optical element after two or more second-order nonlinear optical elements such as a PPLN waveguide are included in the transmitter and the signal light is first generated in the modulator. By contrast, in the transmitter 501 of the optical communication system of the present embodiment, the baseband signals I and Q according to which the signal pair of the signal light and the phase-conjugated light are generated at the output point of the modulator 503 are generated by the digital signal generator 505. It should be noted that the modulated light generated using a baseband signal for generating two subcarriers corresponding to the signal light modulated by the data in the phase conjugate relationship and the phase-conjugated light from one carrier of the light source 502 is used as the signal light.

Accordingly, the signal light from the IQ modulator 505 generates, in the digital domain, I and Q signals according to which spectra of two subcarriers composed of a signal light component and a phase-conjugated light component are generated as digital signals within the operating band range of the electrical components such as the digital signal generation unit 505 and the DACs 505 and 507 and the IQ modulator 503, and the generated I and Q signals are supplied to the IQ modulator 503. That is, modulation of the two subcarriers is performed, and the I and Q signals for generating a spectrum in which one subcarrier component 525 is modulated with signal data and the other subcarrier component 526 is modulated with phase-conjugated signal data are generated in the digital domain. It should be noted here that the modulation signal obtained from the IQ modulator 503 reflects the phase information of the carrier of the light source 502. Also, in the scheme of FIG. 6, in order to compensate for the modulation loss generated when the two subcarrier signals are generated, the modulated light is amplified using the EDFA 504 to obtain the output signal light 524 of the optical transmitter 501.

The signal light 524 output from the transmitter 501 passes through a relay system that compensates for the propagation loss of the optical fiber using the relay-type PSA 509 after transmitting through the one-span dispersion-compensated optical fiber 508. After passing through the same relay system several times in the transmission path 550, the signal light 525 reaches the later-described receiver 601. In this embodiment, the PSA is used as a relay amplifier in order to make the best use of the NF characteristics of the PSA. However, since the effect of improving the SN is obtained even when the PSA is used only with the later-described receiver, an EDFA or Raman amplifier other than the PSA may also be used as the relay amplifier.

Figure 1:
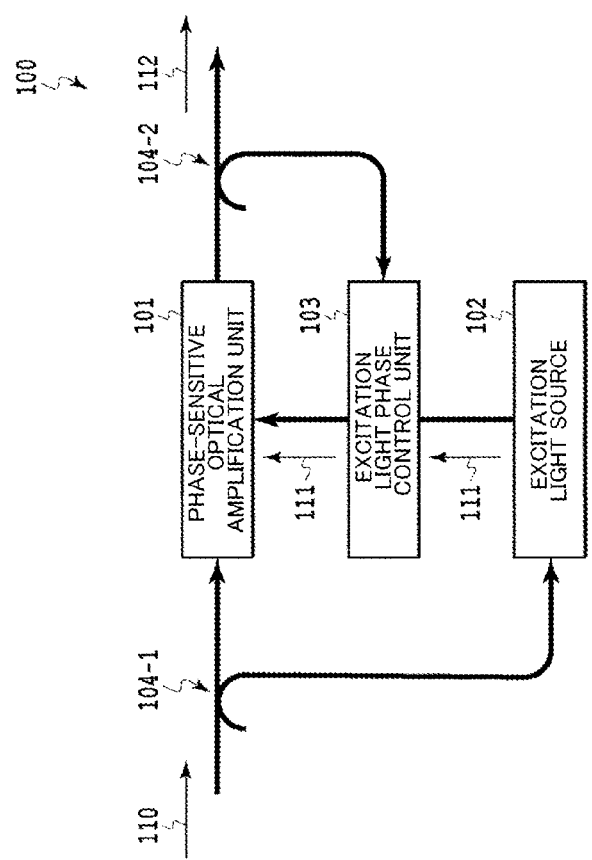
FIG. 1 is a diagram illustrating a configuration of a conventional phase-sensitive optical amplifier.
Figure 2:
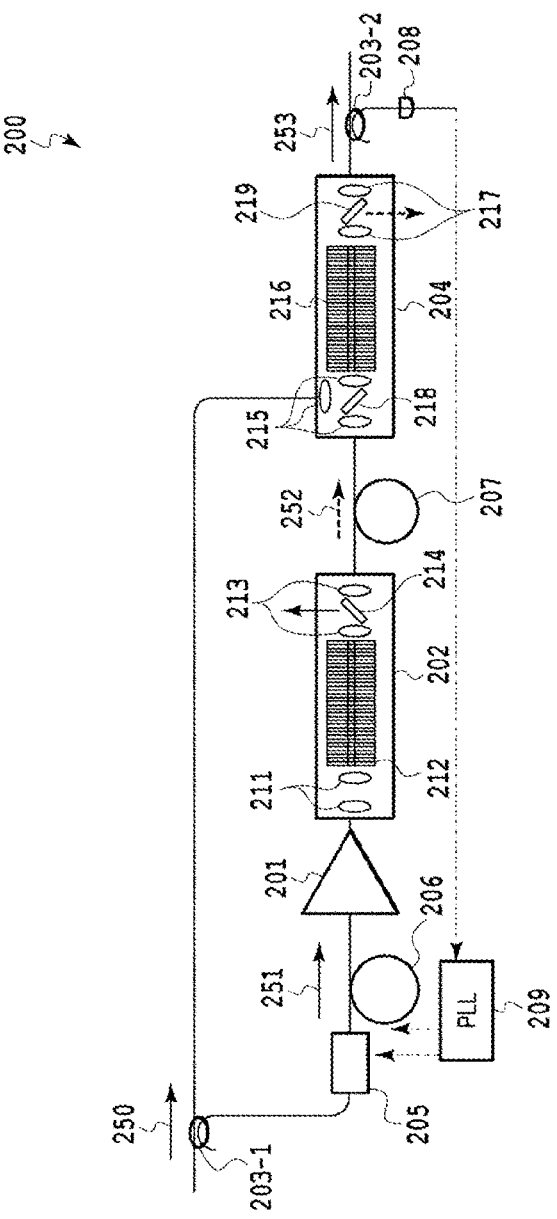
FIG. 2 is a diagram showing a configuration of a phase-sensitive optical amplifier using a second-order nonlinear optical effect.
Figure 3:
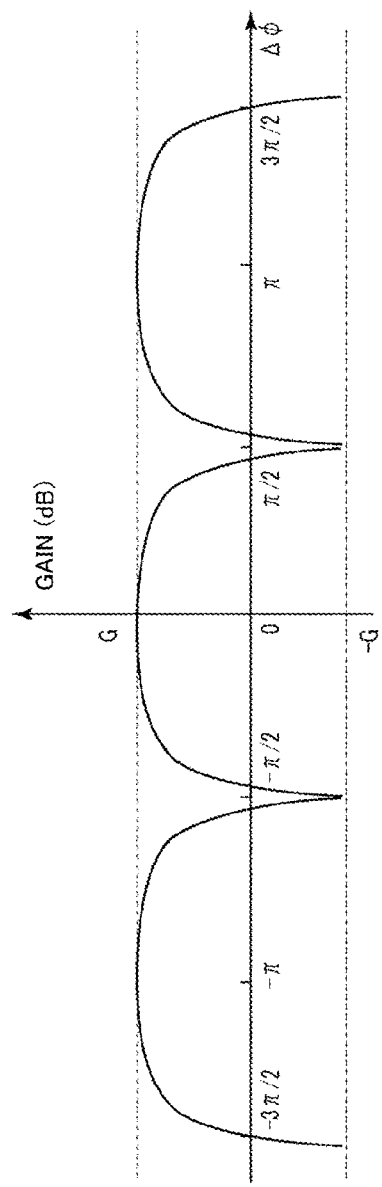
FIG. 3 is a graph showing a relationship between a phase difference Δφ between an input signal light and an excitation light, and a gain.
Figure 4:
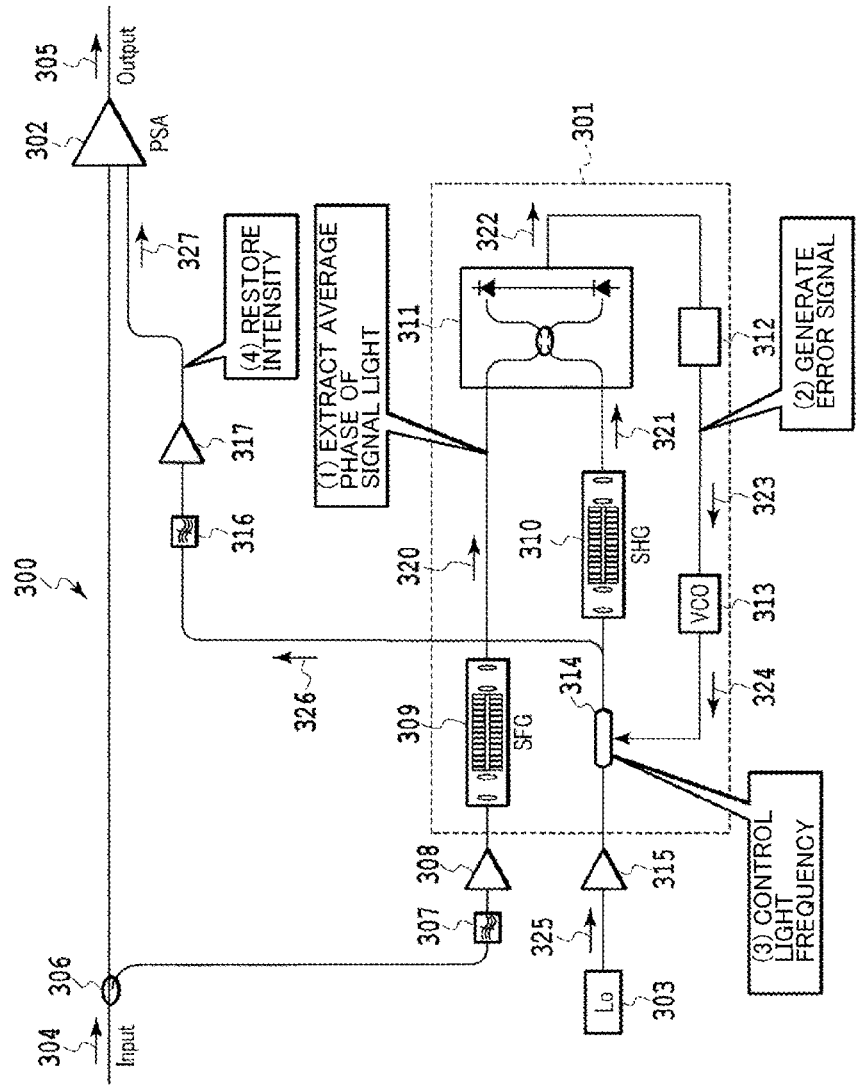
FIG. 4 is a diagram showing a configuration of a relay-type PSA using a conventional optical phase lock loop.

FIG. 7 is a diagram showing a configuration of a receiver of the optical communication system of the first embodiment. The receiver 601 of FIG. 7 corresponds to the receiver 601 in the optical communication system 500 of FIG. 6. The receiver 601 is roughly constituted by a light phase synchronization unit 620, a PSA 603 serving as a preamplifier, and a coherent receiver 630. The overall operation of the receiver 601 is as follows. The light phase synchronization unit 620 uses an OPLL to phase-synchronize the first-order sideband light of local oscillation (Lo) light 655 and the received signal light 650. The PSA 603 amplifies the signal light using the first-order sideband light of the phase-synchronized Lo light as the excitation light 658, and the coherent receiver 630 performs homodyne detection of the amplified signal light 659 using the first-order sideband light 657 of the phase-synchronized Lo light. The phase synchronization unit 620 shown in FIG. 7 has approximately the same configuration as the conventional OPLL circuit shown in FIG. 4, but the first-order sideband 656 of the Lo light including the phase-synchronized sideband is cut out by a band pass filter 621 and is distributed as excitation light 658 for the PSA and phase-synchronized Lo light 657 for the coherent receiver. More detailed operations will be described below.

The signal light 650 that has reached the receiver 601 in FIG. 7 taps a portion thereof with the optical coupler 602, and the tapped signal light 651 proceeds to the phase synchronization unit 620. The signal light of the remaining components is input to the PSA 603 serving as a preamplifier. The tapped signal light 651 is input to the first second-order nonlinear optical element 606 via the BPF 604 and the EDFA 605. Here, the signal light of the two subcarriers of the signal light 525 and its phase-conjugated light 526 is guided to the input point B of the first second-order nonlinear optical element 606.

Figure 5:
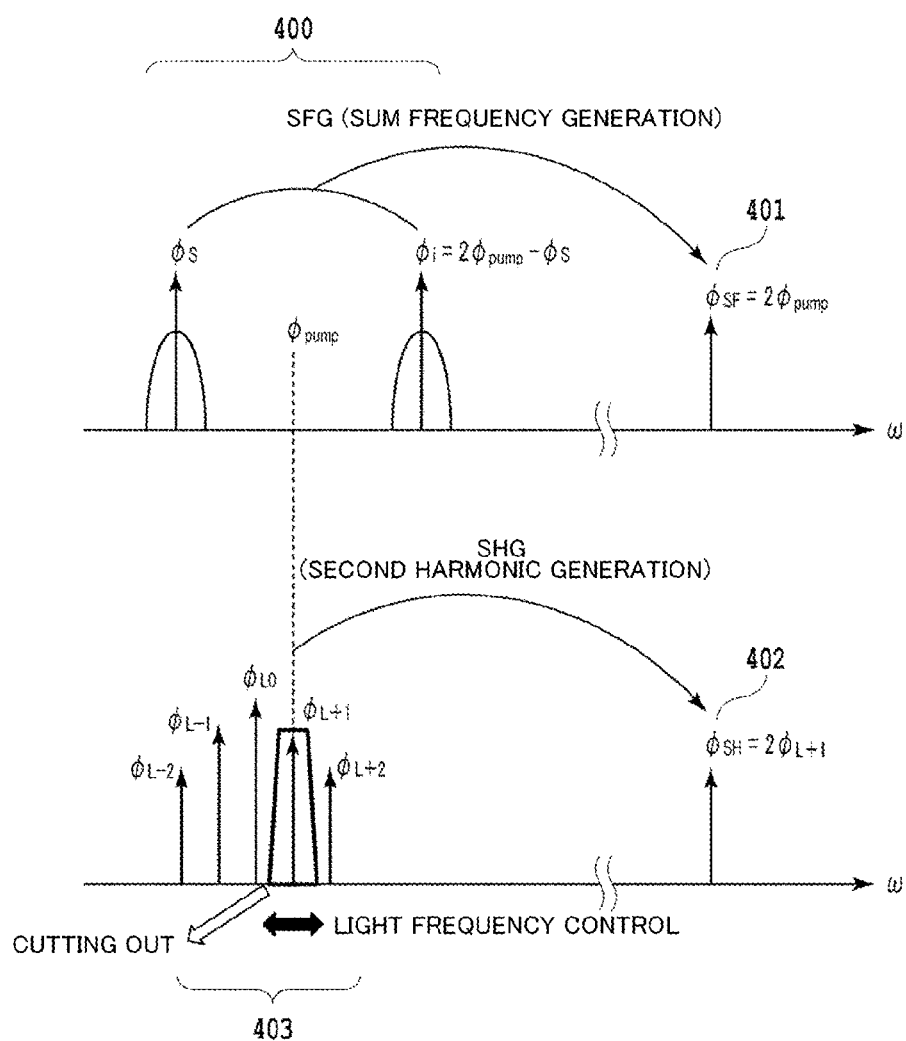
FIG. 5 is a diagram schematically illustrating a spectrum of a signal light or the like in each part of an OPLL.

The local oscillation light 655 from a local oscillation light source 607 is input to an LN phase modulator 609 via an EDFA 608. Similarly to the description of FIG. 4, the phase synchronization unit 620 operates such that the excitation light 656 that is phase-synchronized with the signal light 650 is generated from the tapped signal light 651 according to the principle of the OPLL. That is, if the signal light φs and the phase-conjugated light φi shown in FIG. 5 are replaced with the signal light 525 and the phase-conjugated light 526 of the two subcarrier signals in FIG. 6 for the description of the operations in FIG. 4, it can be described as-is using the operations of the OPLL in FIG. 4.

Although detailed explanation is omitted, the frequency corresponding to the second harmonic light of the carrier light 523 of the light source 502 on the transmission side in FIG. 6 is reproduced by generating the sum frequency light of the signal light 525 and its phase-conjugated light 526 of the two subcarrier signals through the SFG process of the first second-order nonlinear optical element 606. Also, the second harmonic light of, for example, the first-order sideband light among the sideband lights of the Lo light 655 is generated through the SHG process of the second second-order nonlinear optical element 611. The feedback loop of the OPLL is formed by the path of the LN modulator 610, the balanced detector 612, the loop filter 613, and the VCO 614. A modulation signal for generating sideband light is supplied to the LN modulator 609 via the detection output 653 from the balanced detector 612, the error signal of the loop filter 613, and the oscillation output 654 from the VCO 614. The oscillation central operating frequency of the VCO was set to 20 GHz.

As described above, the sideband light component generated from the Lo light 655 from the local oscillation light source 607 by the OPLL in the phase synchronization unit 620 is phase-synchronized with the received signal light 650. That is, the sideband light component appearing on the output side of the LN modulator 610 is synchronized with the carrier light 523 of the transmitter. The sideband light component of the Lo light that is phase-synchronized with the signal light 650 is tapped by the optical coupler 610, and the synchronized light 656 of the signal light from the phase synchronization unit 620 is output. As shown in FIG. 5, only the primary sideband light is cut out by the BPF 621 from the synchronized light 656 including the Lo light 656 and its sideband light, and is amplified by the EDFA 623 to a required level.

The synchronized primary sideband light is branched by the optical coupler 623, a portion is used as the excitation light 658 of the PSA 603 and the rest is used as the Lo light 657 of the coherent receiver 630. In the optical communication system 500 of the present embodiment, the signal light 524 transmitted from the transmitter is composed of two wavelengths of light, namely a signal light component 525 and a phase-conjugated light component 526, but the signal light 524 is generated from the carrier component 523 of the original single light source 502. For this reason, even on the coherent receiver 630 side, the baseband signal can be demodulated with only a single Lo light 657.

Accordingly, the optical communication system 500 of the present disclosure can be implemented as an optical communication system including: a transmitter 501 that outputs a signal light 524 having two subcarriers 525 and 526 that are generated from a single carrier light 523 and are modulated using data in a phase-conjugate relationship; and a receiver 601 including a light phase synchronization mechanism 620 that generates a synchronized light 656 that is phase-synchronized with the signal light transmitted from the transmitter, the light phase synchronization mechanism 620 including a second-order nonlinear optical element 606 that generates a sum frequency light of the two subcarriers of the transmitted signal light, a second-order nonlinear optical element 611 that generates a second harmonic light of sideband light generated from a local oscillation light, and a feedback loop mechanism that compares the frequencies and the phases of the sum frequency light and the second harmonic light and synchronizes the phases of the transmitted signal light and the sideband light, the light phase synchronization mechanism 620 being configured to output the sideband light as the synchronized light, a non-degenerate optical phase-sensitive amplifier 603 that uses the synchronized light to amplify the transmitted signal light; and a coherent receiver 630 that uses the synchronized light to demodulate the amplified signal light. Also, the above-mentioned two subcarriers are directly generated by a quadrature modulator from the baseband signal generated in a digital domain.

By using the configuration of the optical communication system 500, it is possible to generate Lo light synchronized with the signal light on the transmitting side using a single light phase synchronization unit 620 without needing to include a pilot carrier in addition to the signal light. Preamplification and homodyne detection can be implemented by supplying the phase-synchronized light (first-order sideband light) from the light phase synchronization unit 620 as the excitation light of the PSA and the Lo light of the coherent receiver 630. The two subcarriers generated by the baseband signal on the transmitting side, that is, the pair of the signal light and the phase-conjugated light, can be used to generate the carrier phase on the receiving side, and therefore no pilot carrier for synchronizing with the Lo light of the receiver is required in the transmission signal. It is possible to avoid deterioration of signal quality due to unnecessary nonlinear optical processes in the transmission fiber, and the wavelength band used for the pilot carrier can be effectively used.

In the optical communication system 500 of the present embodiment, the light phase synchronization unit 620 uses two PPLN waveguide modules as second-order nonlinear optical elements, and both PPLN-1 and PPLN-2 are used in the SFG process and the SHG process, respectively. PPLN-1 and PPLN-2 respectively include a first spatial optical system and a second spatial optical system, and a PPLN waveguide. The first spatial optical system couples the light input to the PPLN waveguide module to the PPLN waveguide, and the second spatial optical system couples the light output from the PPLN waveguide to the output port of the PPLN waveguide module.

Here, the method of producing the PPLN waveguide used in the light phase synchronization unit 620 of the present embodiment will be illustrated below. First, a periodic electrode with a period of about 17 μm was formed on $LiNbO_3$ to which Zn was added. Next, a polarization inversion grating corresponding to the electrode pattern was formed in $Zn:LiNbO_3$ using an electric field application method. Next, the $Zn:LiNbO_3$ substrate having this periodic polarization inversion structure was directly bonded onto $LiTaO_3$, which is to serve as cladding, and both substrates were firmly bonded through heat treatment at 500° C. Next, the core layer was thinned to about 5 μm through polishing, and a ridge-type optical waveguide was formed using a dry etching process. The temperature of this optical waveguide can be adjusted by a Perche element, and the length of the optical waveguide was 50 mm. The second-order nonlinear optical element having the PPLN waveguide formed in this manner is configured in the form of a module capable of inputting and outputting light with a polarization-holding fiber in the 1.5 μm band. In the present disclosure, $LiNbO_3$ doped with Zn is used, but other non-linear materials such as $KNbO_3$, $LiTaO_3$, $LiNb_xTa_{1-x}O_3$ ($0 \leq x \leq 1$) or $KTiOPO_4$, or a material containing at least one selected from the group consisting of Mg, Zn, Sc, and In as an additive may also be used.

When an attempt was made to transmit 512-QAM signal light using the optical communication system 500 shown in FIGS. 6 and 7, a code error rate of $10^{-3}$ or less was obtained even for the signal transmitted 240 km, and thus characteristics sufficient for signal determination were obtained. By using homodyne detection with a coherent receiver, it was possible to suppress phase fluctuations to 1 degree or less with respect to a minimum phase interval of 1.8 degrees for a 512-QAM signal point. It was possible to ensure sufficient system characteristics in which both intensity noise and phase noise were suppressed even for modulated signals with increased multiplicity.

In the optical communication system of the present disclosure, the synchronized light obtained by using a single phase synchronization mechanism on the receiver side can be supplied to the relay-type PSA and the homodyne detection mechanism, and therefore the PSA and the coherent receiver can be efficiently combined. By forming the signal light from the transmitter with two subcarrier signals generated in the baseband, one carrier phase can be extracted by utilizing the characteristics of the PSA and using the sum frequency of the signal light and its phase-conjugated light. For this reason, the number of pilot carriers can be reduced, and unnecessary nonlinear noise can be suppressed. Intensity noise and phase noise are extremely low, and thus accurate transmission of a modulated signal with increased multiplicity is enabled.

In the first embodiment described above, the case of a single carrier that transmits only a single signal light as the signal light from the transmitter is shown. In the next embodiment, an exemplary configuration of an optical communication system that transmits a WDM signal in which a plurality of signal lights are aligned on a plurality of wavelength channels is shown.

Second Embodiment

Figure 8:
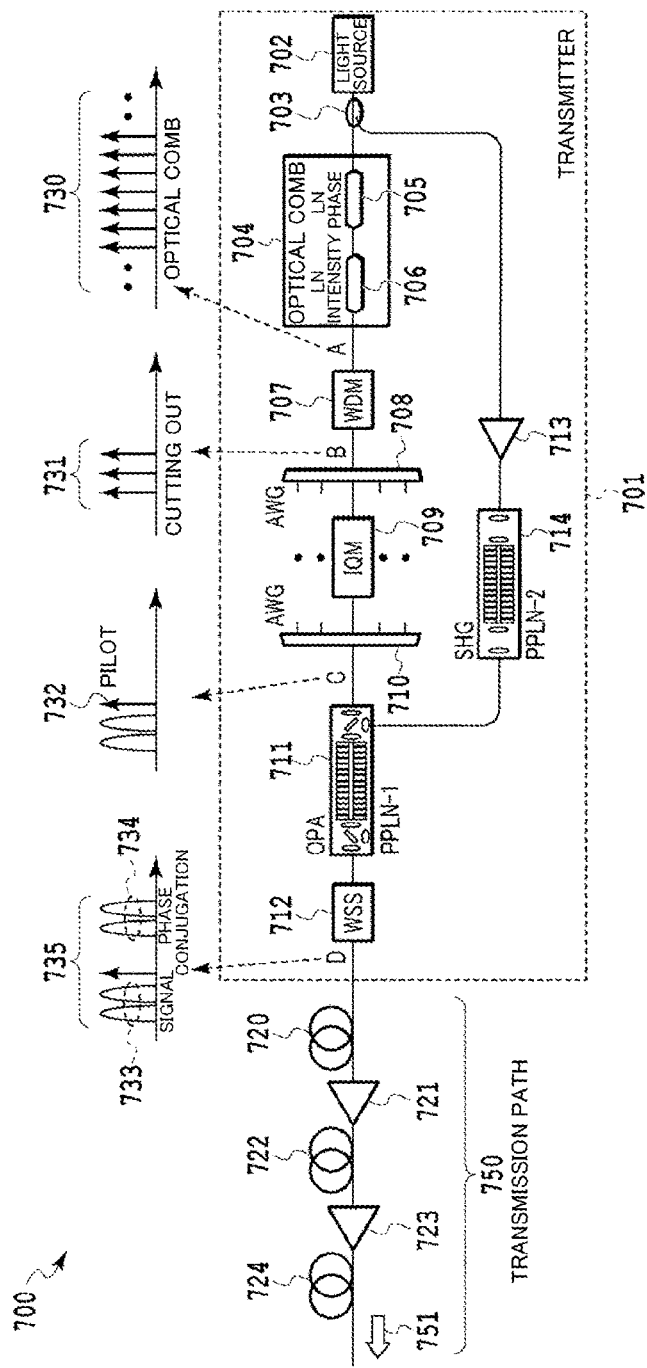
FIG. 8 is a diagram showing a configuration of an optical communication system according to a second embodiment of the present disclosure.
Figure 9:
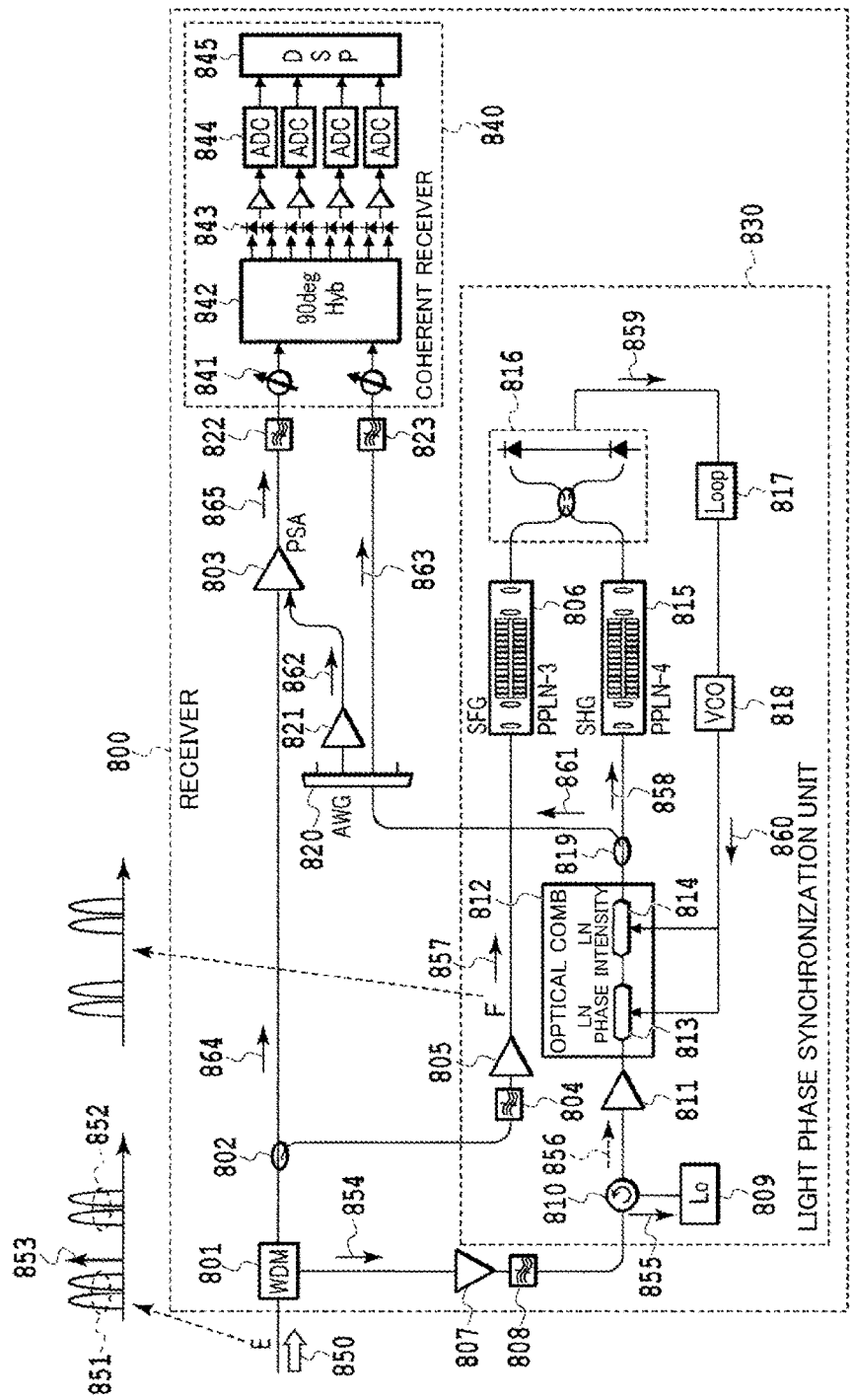
FIG. 9 is a diagram showing a configuration of a receiver of the optical communication system of the second embodiment.

FIG. 8 is a diagram showing a configuration of an optical communication system according to a second embodiment of the present disclosure. An optical communication system 700 of the present embodiment transmits information using a WDM signal 735 including a plurality of signal lights generated from an optical comb from a transmitter 701 to a receiver 800 shown in FIG. 9 via a transmission path 750. In the optical communication system 700 of FIG. 8, the detailed configuration of the transmitter 701 and the elements of the transmission path 750 are shown, and the configuration of the receiver side following the transmission path 750 is shown in FIG. 9.

In the optical communication system 700 of the present embodiment, a configuration is disclosed which includes a receiver 800 including a PSA 803 and a coherent receiver 840 for a WDM signal. The receiver 800 is similar to the first embodiment in that the receiver 800 includes a light phase synchronization mechanism 830, generates a local oscillation light that is synchronized with the transmitted signal light, and supplies the local oscillation light to the PSA 803 and the coherent receiver 840, respectively. The optical communication system 700 uses an optical comb generated from a single light source 702 on the transmitter 701 side as a light source for generating a WDM signal, and transmits a single pilot carrier 732 in addition to the WDM signal. On the receiver 800 side, the local oscillation (Lo) comb light that is phase-synchronized with the optical comb on the transmitting side is restored from the pilot carrier of the received WDM signal by using optical injection locking and OPLL. Lo comb light synchronized with the transmitted WDM signal is used as the excitation light for the PSA and Lo light for homodyne detection, and thus reduction of intensity noise and phase noise of signals with increased multiplicity is enabled. Hereinafter, the configuration and operations of the optical communication system of the present embodiment will be described with reference to FIGS. 8 and 9.

Referring again to FIG. 8, the transmitter 701 uses two second-order nonlinear optical elements (PPLN waveguide modules) to generate the WDM signal, the first second-order nonlinear optical element 711 (PPLN-1) is used for parametric conversion for phase-conjugated light generation, and the second second-order nonlinear optical element 714 (PPLN-2) is used for SH light generation. The first second-order nonlinear optical element 711 includes a first spatial optical system, a second spatial optical system, and a PPLN waveguide, and the second second-order nonlinear optical element 714 includes a third spatial optical system, a fourth spatial optical system, and a PPLN waveguide.

The first spatial optical system couples the light input to the PPLN waveguide module to the PPLN waveguide, and the second spatial optical system couples the light output from the PPLN waveguide to the output port of the PPLN waveguide module. Also, the third spatial optical system couples the light input to the PPLN waveguide module to the PPLN waveguide via the first dichroic mirror, and the fourth spatial optical system couples the light output from the PPLN waveguide to the output port of the PPLN waveguide module via the second dichroic mirror. The method for producing the PPLN waveguide is the same as that in the above-described first embodiment.

In the transmitter 701 of FIG. 8, WDM signals in which the respective signal lights are phase-synchronized to each other are generated. From the viewpoint of efficient use of wavelength resources, it is difficult to prepare local oscillation lights that are individually phase-synchronized for each WDM signal on the transmitter side. In the optical communication system of the present disclosure, in order to realize phase synchronization between WDM signals having different wavelengths on the transmitter side, an optical comb that is phase-synchronized between wavelengths is used as a light source. On the later-described receiver side, an optical comb light source similar to that on the transmitter side is restored using a single pilot carrier 732 that is transmitted together with the WDM signal.

In the transmitter 701, the light output from the single light source 702 is branched into two by the optical coupler 703, and one of the branched lights is used as an optical comb generation unit 704. The other of the branched lights is incident on the second second-order nonlinear optical element 714 for SH light generation (SHG) via the EDFA 713.

In the optical comb generation unit 704, by using a phase modulator 705 and an intensity modulator 706, a flat optical comb 730 with a uniform output level at point A is output. In the output optical comb 730, the wavelength band to be used as the signal light from the transmitter 701 is cut out by the WDM filter 707. For simplicity, FIG. 8 shows an example of an optical comb 731 in which only three waves are cut out at the output point B of the WDM filter 707, but there is no limitation on the number of carriers of the optical comb cut out from the optical comb 730. The cut-out optical comb 731 is separated for each carrier by a wavelength demultiplexer 708, and is modulated for each carrier by an IQ modulator 709. Here, the frequency interval of the optical comb 730 is set to 25 GHz. Each modulated carrier is recombined by a wavelength combiner 710 to obtain a modulated WDM signal at point C in FIG. 8.

In the optical comb 730 generated by the optical comb generation unit 704, only the first-order sideband optical component of the carrier light of the light source 702 is not subjected to data modulation, and is used as a pilot carrier 732 having carrier phase information. The signal light combined by the wavelength combiner 710 is incident on the first second-order nonlinear optical element 711 (PPLN-1), and phase-conjugated light is generated using the SH excitation light input from the second second-order nonlinear optical element 714 (PPLN-2) in the interior. Thereafter, the intensities of the signal light, the phase-conjugated light and the pilot carrier were adjusted using a wavelength selectable switch (WSS) 712. The phase-conjugated light component of the pilot carrier is removed by the WSS to avoid signal quality degradation caused by unnecessary non-linear processes in the transmission path. As a result, at the output point D of the WSS 712, a WDM signal 735 including a signal group composed of a pair of the signal light 733 and each phase-conjugated light 734 on two or more wavelength channels and one pilot carrier 732 is obtained.

The WDM signal 735 from the optical transmitter 701 propagates on the transmission path 750 relayed by the relay-type PSAs 721 and 732 between the dispersion compensation-type optical fibers 720, 722, and 724. The transmitted WDM signal 751 then reaches the receiver described together with FIG. 9.

FIG. 9 is a diagram showing a configuration of the receiver of the optical communication system of the second embodiment. The receiver 800 includes a light phase synchronization unit 830 between the local oscillation (Lo) light obtained using optical injection locking and OPLL and the transmitted WDM signal, a PSA 803 that amplifies the WDM signal transmitted using the phase-synchronized Lo light, and a coherent receiver 840. The light phase synchronization unit 830 has approximately the same configuration as the conventional OPLL circuit shown in FIG. 4, but the optical comb generator 812 is used in combination with the phase modulator 813 and the intensity modulator 814 as the modulator. One wavelength of the phase-synchronized local oscillation optical comb light source branched on the downstream side of the optical comb generator 812 is used as the excitation light for the PSA 803, and the other wavelength is used as the phase-synchronized Lo light for the coherent receiver 840.

In the receiver 800 of FIG. 9, two second-order nonlinear optical elements (PPLN waveguide modules) are used in the light phase synchronization unit 830, the third second-order nonlinear optical element 806 (PPLN-3) being used for sum frequency generation (SFG), and the fourth second-order nonlinear optical element 815 (PPLN-4) being used for SH light generation (SHG). PPLN-3 and PPLN-4 are respectively provided with a first spatial optical system and a second spatial optical system, and a PPLN waveguide. The first spatial optical system couples the light input to the PPLN waveguide module to the PPLN waveguide, and the second spatial optical system couples the light output from the PPLN waveguide to the output port of the PPLN waveguide module.

The WDM signal 850 transmitted through the transmission path from the transmitter reaches the receiver 800. Here, as shown at point E in FIG. 9, the WDM signal 850 includes a signal light group composed of a pair of a signal light and a phase-conjugated light 852, and a pilot carrier 853. First, the pilot carrier 854 is cut out from the transmitted WDM signal 850 by the WDM filter 801. The cut-out pilot carrier 854 is amplified to the required level by the EDFA 807, is passed through the BPF 808, and thereafter is subjected to optical injection locking with the local oscillation light source 809 using a circulator 810. Portions of the signal light and the phase-conjugated light component other than the pilot carrier are tapped by the optical coupler 802 and are input to the light phase synchronization unit 830, and the rest is input to the PSA 803 serving as a preamplifier.

The operations of the light phase synchronization unit 830 are approximately the same as those of the first embodiment, but differ in the following two respects. First, in the light phase synchronization unit 620 of the first embodiment, the local oscillation (Lo) light 655 was free-run, but in the light phase synchronization unit 830 of the present embodiment, the local oscillator 809 performs optical injection locking on the pilot carrier 854 extracted from the WDM signal 850. That is, the sideband light generated from the local oscillation light 856 subjected to optical injection locking is synchronized with the carrier of the light source 702 of the transmitter 701 via the pilot carrier 854.

Secondly, in the first embodiment, the sideband light of the Lo light 655 was used, but in the light phase synchronization unit 830 of the present embodiment, an OPLL having almost the same configuration is used to restore the same optical comb as the optical comb 730 used on the transmitter 701 side instead of the sideband light. That is, at the output point of the optical comb generation unit 812, an optical comb having the same frequency and frequency interval as the optical comb 730 on the transmitter 701 side is restored. Each carrier of the optical comb 861 that is generated from the Lo light subjected to optical injection locking with the pilot carrier 854 and is further phase-synchronized by the OPLL is individually cut out by a wavelength demultiplexer (WDM) 820. Thereafter, one wave is used as excitation light for the PSA 803, and individual wavelength components are used as the Lo light for the coherent receiver 840.

On the receiver side of the optical communication system that handles WDM signals, the coherent receiver performs demodulation/decoding operations in synchronization with a target wavelength channel, and thereafter each demultiplexing output of the AWG 820 is supplied as Lo light for each channel. Accordingly, it should be noted that FIG. 9 shows the coherent receiver 840 for only one channel.

The difference in operation from the light phase synchronization unit of the first embodiment will be described more specifically as follows. At point F of the output of the EDFA 805, a plurality of pairs 857 of signal light and phase-conjugated light tapped by the optical coupler 802 are input to the third second-order nonlinear optical element 806. Here, in the first embodiment, the sum-frequency light was generated from one pair of the signal light and the phase-conjugated light, but in the present embodiment, the sum frequency light is generated from a plurality of pairs of each channel of the WDM signal. However, the sum frequency light generated in each channel has the same frequency as the carrier of the single light source 702 used in the transmitter 701. The signal light and phase-conjugated light of each channel are also synchronized with each other between the channels. Ultimately, one input to the balanced detector 816 is multiplexed in a state in which the sum frequency light generated from the pair of each channel is phase-aligned, and the phase information of the WDM signal transmitted from the transmitter 701 is still detected by the balanced detector 816.

The output of the optical comb generator 812 has a large number of carriers similarly to the optical comb 730 on the transmitter side, and the restored Lo optical comb 858 is input to the fourth second-order nonlinear optical element 815. The second-order nonlinear optical element 815 for SHG generates second harmonic light only for light having the same frequency as one sum frequency light input to the balanced detector 816, and this second harmonic light is input to the other side of the balanced detector 816. Ultimately, the optical signal input to the balanced detector 816 is the same as that in the case of the single carrier transmission of the first embodiment.

The OPLL feedback loop is formed by the path from the balanced detector 816, loop filter 817, and the VCO 818 to the LN phase modulator 813 and the LN intensity modulator 814. A modulation signal for adjusting the frequency and interval of the optical comb is supplied to the optical comb generator 812 via the detection output 859 from the balanced detector 816, the error signal of the loop filter 817, and the oscillation output 860 from the VCO 818.

Accordingly, the optical communication system 700 of the present disclosure can be implemented as an optical communication system including: a transmitter 701 that outputs a wavelength division multiplex (WDM) signal 735 including one pilot carrier 732 and a signal group composed of a pair of a signal light 733 and a phase-conjugated light 734 on two or more wavelength channels, the signal light of the two or more wavelength channels being generated by modulating each optical carrier of a portion of an optical comb 730 generated from a single light source; and a receiver 800 including a light phase synchronization mechanism 830 that generates a synchronized light that is phase-synchronized with the WDM signal transmitted from the transmitter, the light phase synchronization mechanism 830 including a second-order nonlinear optical element 806 that generates a sum frequency light of the signal light and the phase-conjugated light of the transmitted WDM signal, a local oscillation light source 809 that performs injection locking using the pilot carrier 854 extracted from the transmitted WDM signal, a second-order nonlinear optical element 815 that generates one second harmonic light in an optical comb 858 generated from an injection-locked local oscillation light from the local oscillation light source, and a feedback loop mechanism that compares the frequencies and the phases of the sum frequency light and the second harmonic light and synchronizes the phases of the transmitted WDM signal and the optical comb, the light phase synchronization mechanism being configured to output the optical comb as the synchronized light, a non-degenerate optical phase-sensitive amplifier 803 that uses the synchronized light to amplify the transmitted WDM signal, and a coherent receiver 840 that uses the synchronized light to demodulate the amplified WDM signal.

By using the configuration of the light phase synchronization unit 830 in the receiver 800 of the optical communication system of the present embodiment, the PSA and homodyne detection can be used by a single phase synchronization mechanism. Since the carrier phase can be generated using a pair of a signal light and a phase-conjugated light of the WDM signal, the pilot carrier for synchronizing with the Lo light may be only one wave compared to the conventional configuration shown in NPL 7. Therefore, it is possible to avoid deterioration of signal quality due to unnecessary nonlinear optical processes in the transmission fiber that occur due to the use of a two-wave pilot carrier.

In the optical communication system of the present embodiment, a configuration in which a phase modulator and an intensity modulator are connected in series was used as the optical comb generator 704 of the transmitter 701 and the optical comb generation unit 812 of the receiver 800, but an optical comb generation means other than this configuration may also be used. For example, an optical comb generation means obtained by combining sideband light generated by a phase modulator or the like and a nonlinear optical medium can be used. Here, a highly nonlinear fiber, PPLN, or the like may be used as the nonlinear optical medium.

In the optical communication system of the present embodiment as well, a relay-type PSA and homodyne detection can be formed using a single phase synchronization mechanism in the receiver. By merely sending a single pilot carrier together therewith, it is possible to transmit a WDM signal including a signal light with increased multiplicity with very little intensity noise and phase noise. Since the characteristics of the PSA can be utilized to extract the phase of a single carrier on the transmitter side using the sum frequency light of the signal light and the phase-conjugated light, it is possible to reduce the number of pilot carriers and unnecessary nonlinear noise can be suppressed.

In the first embodiment described above, an example was described in which the first-order sideband light on the high frequency side of the local oscillation light is used to generate the excitation light in the LN modulator. This is because the generation intensity of the first-order sideband light is large and it is easy to handle. However, the first-order sideband light on the low frequency side can also be used as the sideband light, and the sideband light of the second order or higher can also be used. Also, the central oscillation frequency of the VCO that supplies the modulation signal to the LN modulator in the OPLL was set to 20 GHz, but there is no limitation to this.

Also, it goes without saying that the optical communication system of the present disclosure also has an aspect as an invention of an optical receiver that receives the signal light of the first embodiment or the WDM signal of the second embodiment. The optical communication system of the first embodiment may also be the invention of the optical receiver 601 having the configuration shown in FIG. 7, in which signal light having a configuration having two sub-carriers directly generated from a characteristic baseband signal described in FIG. 6 is received. That is, the optical receiver 601 can be implemented as an optical receiver 601 that receives, from the transmitter 501, the signal light 524 having two subcarriers 525 and 526 modulated by data that is in a phase-conjugate relationship and is generated from the single carrier light 523, and includes: a light phase synchronization mechanism 620 that generates a synchronized light 656 that is phase-synchronized with the signal light transmitted from the transmitter, the light phase synchronization mechanism including a second-order nonlinear optical element 606 that generates a sum frequency light of the two sub-carriers of the transmitted signal light, a second-order nonlinear optical element 611 that generates a second harmonic light of sideband light generated from a local oscillation light, and a feedback loop mechanism that compares the frequencies and the phases of the sum frequency light and the second harmonic light and synchronizes the phases of the transmitted signal light and the sideband light, the light phase synchronization mechanism being configured to output the sideband light as the synchronization light; a non-degenerate optical phase-sensitive amplifier 603 that uses the synchronized light to amplify the transmitted signal light; and a coherent receiver 630 that uses the synchronized light to demodulate the amplified signal light.

Similarly, in the second embodiment, the optical communication system may also be the invention of the optical receiver 800 having the configuration shown in FIG. 9, in which the characteristic WDM signal illustrated in FIG. 8 is received. That is, the receiver 800 can be implemented also as a receiver 800 that receives, from the transmitter 701, a wavelength division multiplexing (WDM) signal 735 including one pilot carrier 732 and a signal group composed of a pair of a signal light 733 and a phase-conjugated light 734 on two or more wavelength channels, the signal light of the two or more wavelength channels being generated by modulating each optical carrier of a portion of an optical comb 730 generated from a single light source light, the receiver 800 including: a light phase synchronization mechanism 830 that generates a synchronized light that is phase-synchronized with the WDM signal transmitted from the transmitter, the light phase synchronization mechanism 830 including a second-order nonlinear optical element 806 that generates a sum frequency light of the signal light and the phase-conjugated light of the transmitted WDM signal, a local oscillation light source 809 that performs injection locking using the pilot carrier 854 extracted from the transmitted WDM signal, a second-order nonlinear optical element 815 that generates one second harmonic light in an optical comb 858 generated from the injection-locked local oscillation light from the local oscillation light source, and a feedback loop mechanism that compares the frequencies and the phases of the sum frequency light and the second harmonic light and synchronizes the phases of the transmitted WDM signal and the optical comb, the light phase synchronization mechanism being configured to output the optical comb as the synchronized light; a non-degenerate optical phase-sensitive amplifier 803 that uses the synchronized light to amplify the transmitted WDM signal; and a coherent receiver 840 that uses the synchronized light to demodulate the amplified WDM signal.

As described in detail above, the optical communication system of the present disclosure can realize an optical communication system that efficiently combines a relay-type PSA and homodyne detection using a single phase synchronization mechanism. Intensity noise and phase noise can be suppressed to a very low level, and accurate transmission of signals with increased multiplicity is enabled. By utilizing the features of a PSA to extract the phase of a single carrier using the sum frequency light of the signal light and its phase-conjugated light, it is possible to reduce the number of pilot carriers compared to the configuration of the conventional optical communication system, and it is possible to suppress unnecessary non-linear noise.

INDUSTRIAL APPLICABILITY

The present invention can be used for communication. More specifically, it can be used as an optical communication system.

The invention claimed is:

1. An optical communication system comprising:
transmitter configured to output a signal light having two subcarriers that are generated from a single carrier light and are modulated using data in a phase-conjugate relationship; and
a receiver including
a light phase synchronization mechanism configured to generate a synchronized light that is phase-synchronized with the signal light transmitted from the transmitter, the light phase synchronization mechanism including a second-order nonlinear optical element configured to generate a sum frequency light of the two subcarriers of the transmitted signal light, a second-order nonlinear optical element configured to generate a second harmonic light of sideband light generated from a local oscillation light, and a feedback loop mechanism configured to compare frequencies and phases of the sum frequency light and the second harmonic light and synchronize the phases of the transmitted signal light and the sideband light, the light phase synchronization mechanism being configured to output the sideband light as the synchronization light,
a non-degenerate optical phase-sensitive amplifier configured to use the synchronized light to amplify the transmitted signal light, and
a coherent receiver configured to use the synchronized light to demodulate the amplified signal light.

2. The optical communication system according to claim 1,
wherein the two subcarriers are directly generated by a quadrature modulator from a baseband signal generated in a digital domain, and
the sideband light is a first-order sideband light on a high-frequency side of output from the local oscillation light.

3. The optical communication system according to claim 1, wherein the optical phase-sensitive amplifier includes a second-order nonlinear optical element configured to generate a second harmonic light from the synchronized light, a second-order nonlinear optical element configured to perform non-degenerate parametric amplification of the transmitted signal light, and a means for synchronizing the phases of the transmitted signal light and the synchronized light.

4. The optical communication system according to claim 1,
wherein an optical waveguide included in the second-order nonlinear optical element is a direct-bonded ridge waveguide, and
the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or
a material obtained by adding at least one selected from the group consisting of Mg, Zn, Sc, and In as an additive to any of these materials.

5. The optical communication system according to claim 2, wherein the optical phase-sensitive amplifier includes a second-order nonlinear optical element configured to generate a second harmonic light from the synchronized light, a second-order nonlinear optical element configured to perform non-degenerate parametric amplification of the transmitted signal light, and a means for synchronizing the phases of the transmitted signal light and the synchronized light.

6. The optical communication system according to claim 2,
wherein an optical waveguide included in the second-order nonlinear optical element is a direct-bonded ridge waveguide, and
the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or
a material obtained by adding at least one selected from the group consisting of Mg, Zn, Sc, and In as an additive to any of these materials.

7. The optical communication system according to claim 3,
wherein an optical waveguide included in the second-order nonlinear optical element is a direct-bonded ridge waveguide, and
the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or
a material obtained by adding at least one selected from the group consisting of Mg, Zn, Sc, and In as an additive to any of these materials.

8. An optical communication system comprising:
a transmitter configured to output a wavelength division multiplexing (WDM) signal including one pilot carrier and a signal group including a pair of a signal light and a phase-conjugated light on two or more wavelength channels, the signal light of the two or more wavelength channels being generated by modulating each optical carrier of a portion of an optical comb generated from a single light source light; and
a receiver including
a light phase synchronization mechanism configured to generate a synchronized light that is phase-synchronized with the WDM signal transmitted from the transmitter, the light phase synchronization mechanism including
a second-order nonlinear optical element configured to generate a sum frequency light of the signal light and the phase-conjugated light of the transmitted WDM signal,
a local oscillation light source configured to perform injection locking using the pilot carrier extracted from the transmitted WDM signal, a second-order nonlinear optical element configured to generate one second harmonic light in an optical comb generated from an injection-locked local oscillation light from the local oscillation light source, and a feedback loop mechanism configured to compare frequencies and phases of the sum frequency light and the second harmonic light and synchronize the phases of the transmitted WDM signal and the optical comb, the light phase synchronization mechanism being configured to output the optical comb as the synchronized light, a non-degenerate optical phase-sensitive amplifier configured to use the synchronized light to amplify the transmitted WDM signal, and a coherent receiver configured to use the synchronized light to demodulate the amplified WDM signal.

9. The optical communication system according to claim 8, wherein the transmitter includes a second-order nonlinear optical element configured to generate a second harmonic light from a portion of the single light source light, and a second-order nonlinear optical element configured to generate a corresponding phase-conjugated light from the modulated signal light, and the optical phase-sensitive amplifier includes a second-order nonlinear optical element configured to generate a second harmonic light from the synchronized light generated by the light phase synchronization mechanism, a second-order nonlinear optical element configured to perform non-degenerate parametric amplification of the transmitted WDM signal, and a means for synchronizing the phases of the transmitted WDM signal and the synchronized light.

10. The optical communication system according to claim 8, wherein the feedback loop mechanism includes an optical comb generation unit that is formed by connecting a phase modulator and an intensity modulator or nonlinear optical medium in series, and is configured to generate an optical comb from the injection-locked local oscillation light and output the generated optical comb to the second-order nonlinear optical element configured to generate the second harmonic light, a balanced detector configured to compare the sum frequency light and the second harmonic light, and a voltage control oscillator (VCO) configured to generate a control signal to the optical comb generation unit based on an error signal from the balanced detector.

11. The optical communication system according to claim 8, wherein the receiver includes a wavelength demultiplexer configured to select, as the synchronized light, one wavelength of the synchronized optical comb that corresponds to the signal light of one wavelength channel to be demodulated by the coherent receiver.

12. The optical communication system according to claim 9, wherein the receiver includes a wavelength demultiplexer configured to select, as the synchronized light, one wavelength of the synchronized optical comb that corresponds to the signal light of one wavelength channel to be demodulated by the coherent receiver.

13. The optical communication system according to claim 10, wherein the receiver includes a wavelength demultiplexer configured to select, as the synchronized light, one wavelength of the synchronized optical comb that corresponds to the signal light of one wavelength channel to be demodulated by the coherent receiver.

14. The optical communication system according to claim 8, wherein an optical waveguide included in the second-order nonlinear optical element is a direct-bonded ridge waveguide, and the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or a material obtained by adding at least one selected from the group consisting of Mg, Zn, Sc, and In as an additive to any of these materials.

15. The optical communication system according to claim 9, wherein an optical waveguide included in the second-order nonlinear optical element is a direct-bonded ridge waveguide, and the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or a material obtained by adding at least one selected from the group consisting of Mg, Zn, Sc, and In as an additive to any of these materials.

16. The optical communication system according to claim 10, wherein an optical waveguide included in the second-order nonlinear optical element is a direct-bonded ridge waveguide, and the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or a material obtained by adding at least one selected from the group consisting of Mg, Zn, Sc, and In as an additive to any of these materials.

17. The optical communication system according to claim 11, wherein an optical waveguide included in the second-order nonlinear optical element is a direct-bonded ridge waveguide, and the direct-bonded ridge waveguide is constituted by any of $LiNbO_3$, $KNbO_3$, $LiTaO_3$, $LiNb_{(x)}Ta_{(1-x)}O_3$ ($0 \leq x \leq 1$), or $KTiOPO_4$, or a material obtained by adding at least one selected from the group consisting of Mg, Zn, Sc, and In as an additive to any of these materials.

* * * * *